US010619931B2

(12) United States Patent
Han et al.

(10) Patent No.: US 10,619,931 B2
(45) Date of Patent: Apr. 14, 2020

(54) RADIATOR AND CONDENSER ASSEMBLY

(71) Applicant: Hanon Systems, Daejeon (KR)

(72) Inventors: Jeong Wan Han, Daejeon (KR); Jae Yong Kim, Daejeon (KR); Hyuk Kim, Daejeon (KR); Jong Du Lee, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 60 days.

(21) Appl. No.: 15/039,665

(22) PCT Filed: Sep. 1, 2015

(86) PCT No.: PCT/KR2015/009190
§ 371 (c)(1),
(2) Date: May 26, 2016

(87) PCT Pub. No.: WO2016/036109
PCT Pub. Date: Mar. 10, 2016

(65) Prior Publication Data
US 2017/0167795 A1 Jun. 15, 2017

(30) Foreign Application Priority Data

Sep. 1, 2014 (KR) .................. 10-2014-0115405
Aug. 31, 2015 (KR) .................. 10-2015-0122539

(51) Int. Cl.
*F28D 1/04* (2006.01)
*F28F 9/00* (2006.01)
(Continued)

(52) U.S. Cl.
CPC ......... *F28D 1/0435* (2013.01); *B60H 1/3227* (2013.01); *B60K 11/04* (2013.01); *F28F 9/002* (2013.01)

(58) Field of Classification Search
CPC ........ B60K 11/04; F28F 9/002; F28D 1/0435; B60H 1/3227
See application file for complete search history.

(56) References Cited

U.S. PATENT DOCUMENTS 5,901,573 A * 5/1999 Kobayashi ........... B60H 1/3229
62/507
6,158,500 A * 12/2000 Heine .................... B60K 11/04
165/140

(Continued)

FOREIGN PATENT DOCUMENTS

DE 102008047077 A1 * 6/2009 .......... F28D 1/0435
EP 1726469 B1 * 8/2008 .......... F28D 1/0443
(Continued)

OTHER PUBLICATIONS

DE102008047077A1 machine translation (Year: 2009).*

*Primary Examiner* — Gordon A Jones
(74) *Attorney, Agent, or Firm* — Shumaker, Loop & Kendrick, LLP; James D. Miller

(57) ABSTRACT

Provided is a radiator and condenser assembly, and more particularly, a radiator and condenser assembly capable of forming a pair of protrusions for horizontally fixing the condenser at a lower portion of a header tank of the radiator and forming a fixed part in a 'U' shape for fixing the condenser in a front and back direction to directly fix a vapor-liquid separator of the condenser to the header tank of the radiator to remove a fixed bracket formed in the condenser, thereby saving component manufacturing costs and additional process and processing costs for forming the fixed bracket.

16 Claims, 9 Drawing Sheets

(51) Int. Cl.
*B60H 1/32* (2006.01)
*B60K 11/04* (2006.01)

(56) References Cited

U.S. PATENT DOCUMENTS

| | | | |
|---|---|---|---|
| 7,175,142 B2* | 2/2007 | Brown | F28F 9/007 |
| | | | 248/200 |
| 7,861,988 B2* | 1/2011 | Hamida | B60K 11/04 |
| | | | 180/68.4 |
| 9,733,022 B2* | 8/2017 | Wilkins | F28D 1/0435 |
| 2005/0008428 A1* | 1/2005 | Desai | F28D 1/0408 |
| | | | 403/13 |
| 2006/0081363 A1* | 4/2006 | Chissus | F28D 1/0435 |
| | | | 165/173 |
| 2006/0213639 A1* | 9/2006 | Kobayashi | B60K 11/04 |
| | | | 165/67 |
| 2007/0144713 A1* | 6/2007 | Sugimoto | F28D 1/0452 |
| | | | 165/140 |
| 2009/0249813 A1* | 10/2009 | Zeolla | B01D 35/18 |
| | | | 62/317 |
| 2011/0209935 A1* | 9/2011 | Nantais | B60K 11/04 |
| | | | 180/68.4 |
| 2011/0304176 A1* | 12/2011 | Kihara | B60K 11/04 |
| | | | 296/193.09 |
| 2014/0301816 A1* | 10/2014 | Kokuryo | B60K 11/04 |
| | | | 414/687 |

FOREIGN PATENT DOCUMENTS

| | | |
|---|---|---|
| FR | 2825459 A1 | 12/2002 |
| JP | 2001-124491 | 5/2001 |
| JP | 2010-255868 | 11/2010 |
| KR | 1020040060359 A | 7/2004 |
| KR | 1020140083339 A | 12/2012 |
| KR | 102013010270 A | 9/2013 |
| KR | 1020130143340 | 12/2013 |

* cited by examiner

RADIATOR AND CONDENSER ASSEMBLY

CROSS-REFERENCE TO RELATED PATENT APPLICATIONS

This patent application is a United States national phase patent application based on PCT/KR2015/009190 filed Sep. 1, 2015, which claims the benefit of Korean Patent Application No. 10-2015-0122539 filed Aug. 31, 2015 and Korean Patent Application No. 10-2014-0115405 filed Sep. 1, 2014, the entire disclosures of which are hereby incorporated herein by reference.

TECHNICAL FIELD

The present invention relates to a radiator and condenser assembly, and more particularly, to a radiator and condenser assembly capable of directly fixing a vapor-liquid separator of the condenser to a header tank of the radiator to remove a fixed bracket formed in the condenser, thereby saving component manufacturing costs and additional process and processing costs for forming the fixed bracket.

BACKGROUND ART

In general, an engine room of a vehicle includes components for driving such as an engine and various heat exchangers such as a radiator, an intercooler, an evaporator, and a condenser for cooling each component in the vehicle such as an engine or controlling air temperature in the vehicle. The heat exchangers generally have a heat exchange medium distributed therein and exchange heat between the heat exchange medium in the heat exchanger and air outside the heat exchangers to perform cooling or heat radiation. Therefore, to stably operate various heat exchangers in the engine room of the vehicle, external air should be smoothly supplied into the engine room. Hereinafter, as described above, the heat exchangers installed to cool the components of the vehicle or the inside of the vehicle are collectively called a cooling module.

In this case, the radiator 10 is an apparatus for cooling a coolant heated while passing through the engine and includes a pair of first header tanks 11, a first inlet pipe 12 into which the coolant is introduced and a first outlet pipe 13 from which the coolant is discharged; first tubes 14 having both ends fixed to the pair of first header tanks 11 to form a coolant passage; and a first fin 15 inserted between the first tubes 14.

Meanwhile, the condenser 20 is included in a refrigerant cycle of an air conditioning device and is introduced with a refrigerant in a high temperature and high pressure gas state to condense the refrigerant in the gas state into a refrigerant in a liquid state while discharging liquefaction heat by the heat exchange and then discharge the refrigerant in the liquid state.

The condenser 20 includes a pair of second header tanks 21, a second inlet pipe 22 into which the refrigerant is introduced and a second outlet pipe 23 from which the refrigerant is discharged, second tubes 24 having both ends fixed to the pair of second header tanks 21 to form a refrigerant passage, a second fin 25 inserted between the second tubes 24, and a vapor-liquid separator 26 separating a vapor refrigerant and a liquid refrigerant.

In this case, an example of a structure for integrally assembling the radiator 10 with the condenser 20 is illustrated in FIGS. 1 and 2.

As illustrated, in the radiator and condenser assembly 1, a fixed part 16 protrudes at the first header tank 11 of the radiator 10, a separate bracket 27 is formed at the second header tank 21 of the condenser 20, and the bracket 27 is fixed to the fixed part 16.

Further, in the radiator and condenser assembly, to increase the fixing force, the case in which two brackets are installed at the pair of first header tanks, respectively, and therefore a total of four brackets are installed is general. As a result, a separate component should be manufactured and assembled and therefore manufacturing costs of the component and additional process and processing costs for fixing the bracket are increased, thereby increasing production costs.

RELATED ART DOCUMENT

Patent Document

KR 10-2013-0143340 A (Dec. 31, 2013)

Technical Problem

An object of the present invention is to provide a radiator and condenser assembly capable of directly fixing a lower portion of a vapor-liquid separator of the condenser to a header tank of the radiator to remove a fixed bracket formed in the condenser, thereby saving component manufacturing costs and additional process and processing costs for forming the fixed bracket.

Technical Solution

In one general aspect, a radiator and condenser assembly 1000 includes: a radiator 100 including a 1-1-th header tank 110 and a 1-2-th header tank 120, a plurality of first tubes 130 having both ends fixed to the 1-1-th header tank 110 and the 1-2-th header tank 120, first fins 140 inserted between the first tubes 130, and a fixed part 150 formed at a lower portion of the 1-2-th header tank 120; and a condenser 200 including a 2-1-th header tank 210 and a 2-2-th header tank 220, a plurality of second tubes 230 having both ends fixed to the 2-1-th header tank 210 and the 2-2-th header tank 220 to form a refrigerant passage, second fins 240 inserted between the second tubes 230, and a vapor-liquid separator 250 connected to the 2-2-th header tank 220 to separate a vapor refrigerant and a liquid refrigerant, in which the lower portion of the vapor-liquid separator 250 of the condenser 200 is coupled and fixed to the fixed part 150 of the radiator 100 and the vapor-liquid separator 250 is inserted into the fixed part 150 downward from above and thus the fixed part 150 fixes the movement of the vapor-liquid separator 250 in a front and back direction and a left and right direction.

At least three places of an outer circumferential surface of the vapor-liquid separator 250 of the condenser 200 based on a central axis may be supported by the fixed part 150 of the radiator 100.

The fixed part 150 of the radiator 100 may include a pair of fixed protrusions 151 protruding from the 1-2-th header tank 120 and spaced apart from each other to support one side of the outer circumferential surface of the vapor-liquid separator 250 and a fixed bracket 152 including a horizontal part 154 and a vertical part 153 extending in an 'L' shape from the 1-2-th header tank 120, the vertical part 153 supporting the other side of the outer circumferential surface of the vapor-liquid separator 250.

A lower side surface of the vapor-liquid separator 250 of the condenser 200 may be spaced apart from the horizontal part 154 of the fixed bracket 152 by a predetermined distance.

A lower end of the vapor-liquid separator 250 of the condenser 200 may be further supported by the fixed bracket 152 of the fixed part 150 of the radiator 100.

The vertical part 153 of the fixed bracket 152 may include a cut part 153-1 in a 'C' shape and a support part 153-2 formed by the cut part 153-1 may protrude from the vertical part 153 toward the 1-2-th header tank 120.

An upper end of an inside of the vertical part 153 and the support part 153-2 may be formed with an inclined part 155.

In the fixed part 150, a distance from an upper side surface of the fixed protrusion 151 to an upper end of the support part 153-2 may be within 30 mm.

In the fixed bracket 152, an 'L'-shaped inside or outside may be formed with a reinforcement rib 152a.

In the fixed part 150, a height of a pair of fixed protrusions 151 may be higher than that of an upper end of the vertical part 153.

The fixed part 150 may be integrated with the 1-2-th tank 120 by an injection molding.

An upper portion of the 1-2-th header tank 120 may be formed with an upper coupling part 160 and a position corresponding to the upper coupling part 160 of the condenser 200 may be formed with the upper bracket 260 to allow the upper bracket 260 to be inserted into the upper coupling part 160 downward from above.

Advantageous Effects

According to the radiator and condenser assembly in accordance with the exemplary embodiments of the present invention, it is possible to save the component manufacturing costs and the additional process and processing costs for forming the fixed bracket by removing the fixed bracket formed in the condenser.

DESCRIPTION OF AN EMBODIMENT OF THE INVENTION

Hereinafter, a radiator and condenser assembly according to an exemplary embodiment of the present invention having a configuration as described above will be described in detail with reference to the accompanying drawings.

Figure 1:
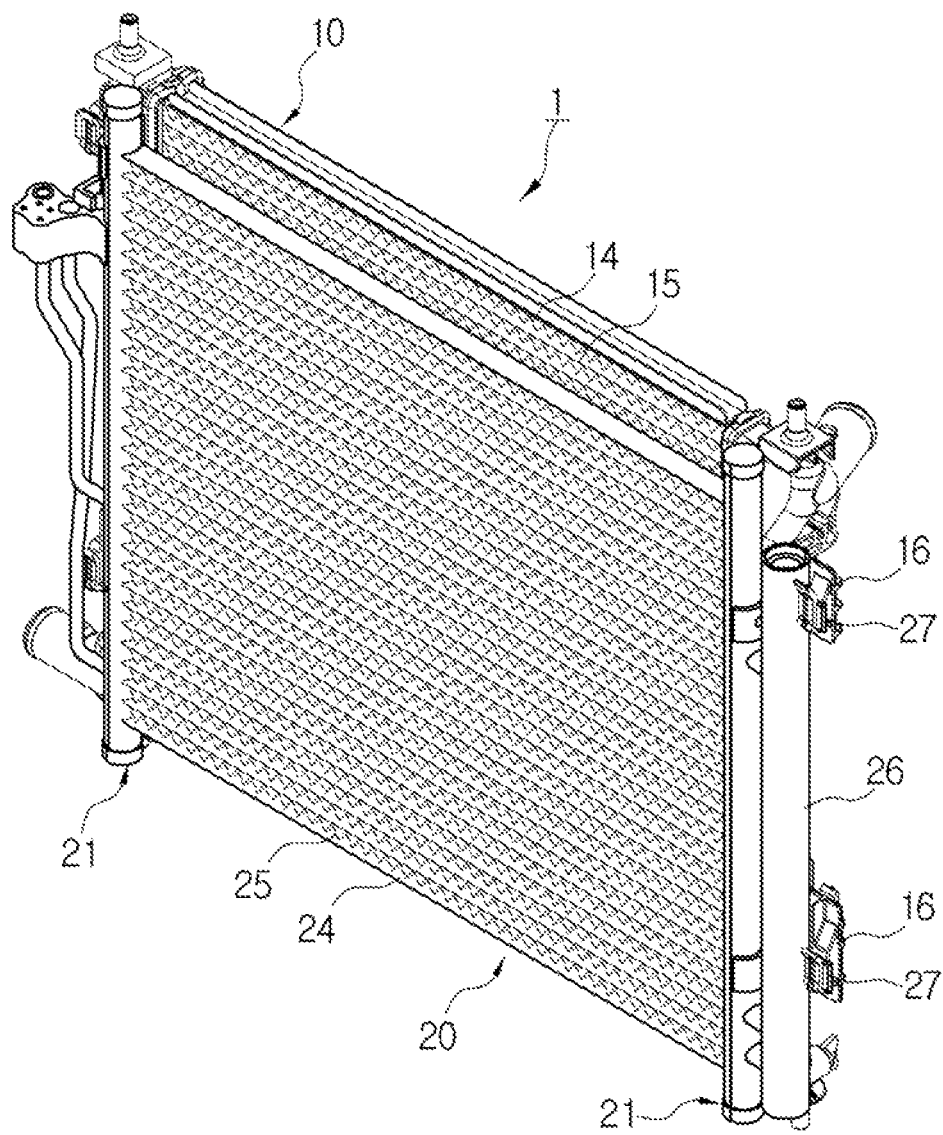
FIG. 1 is an assembled perspective view illustrating the existing radiator and condenser assembly.
Figure 2:
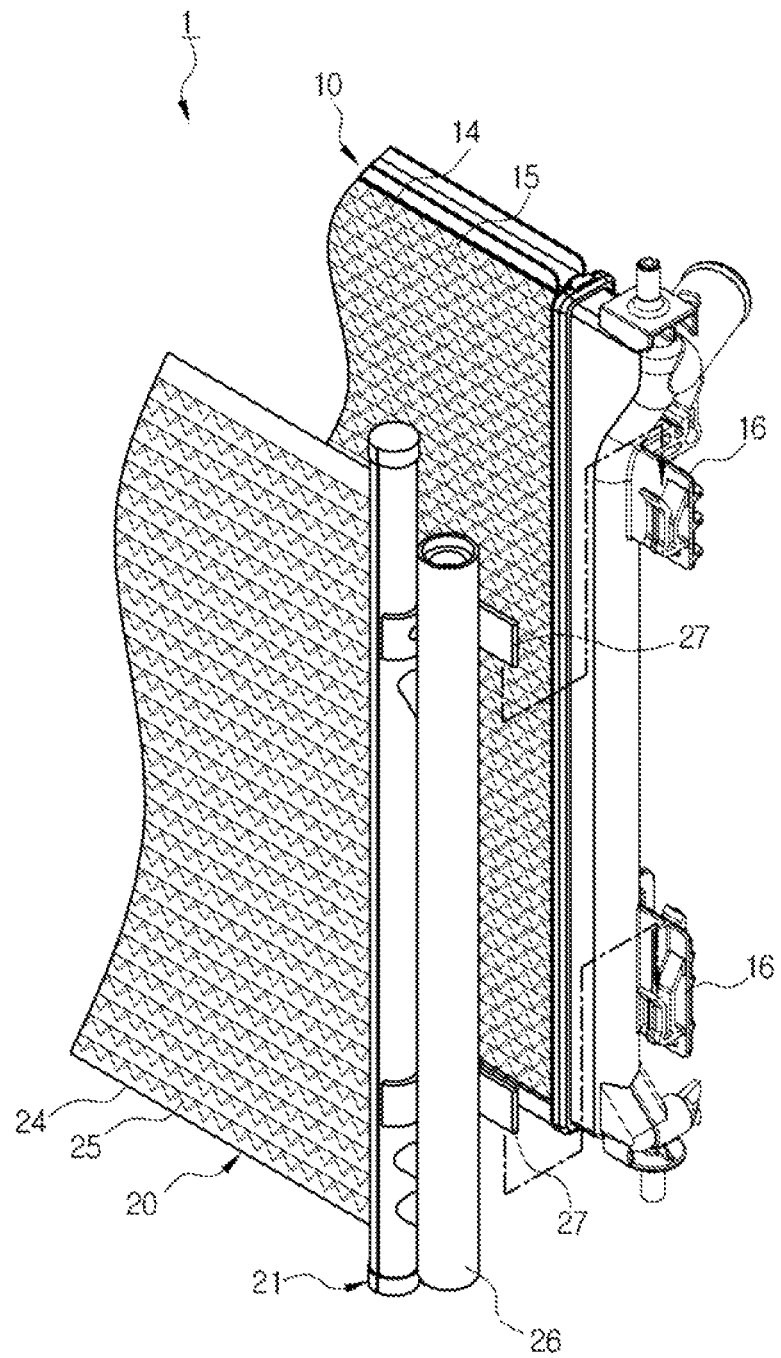
FIG. 2 is a partial exploded perspective view illustrating the existing radiator and condenser assembling structure.
Figure 3:
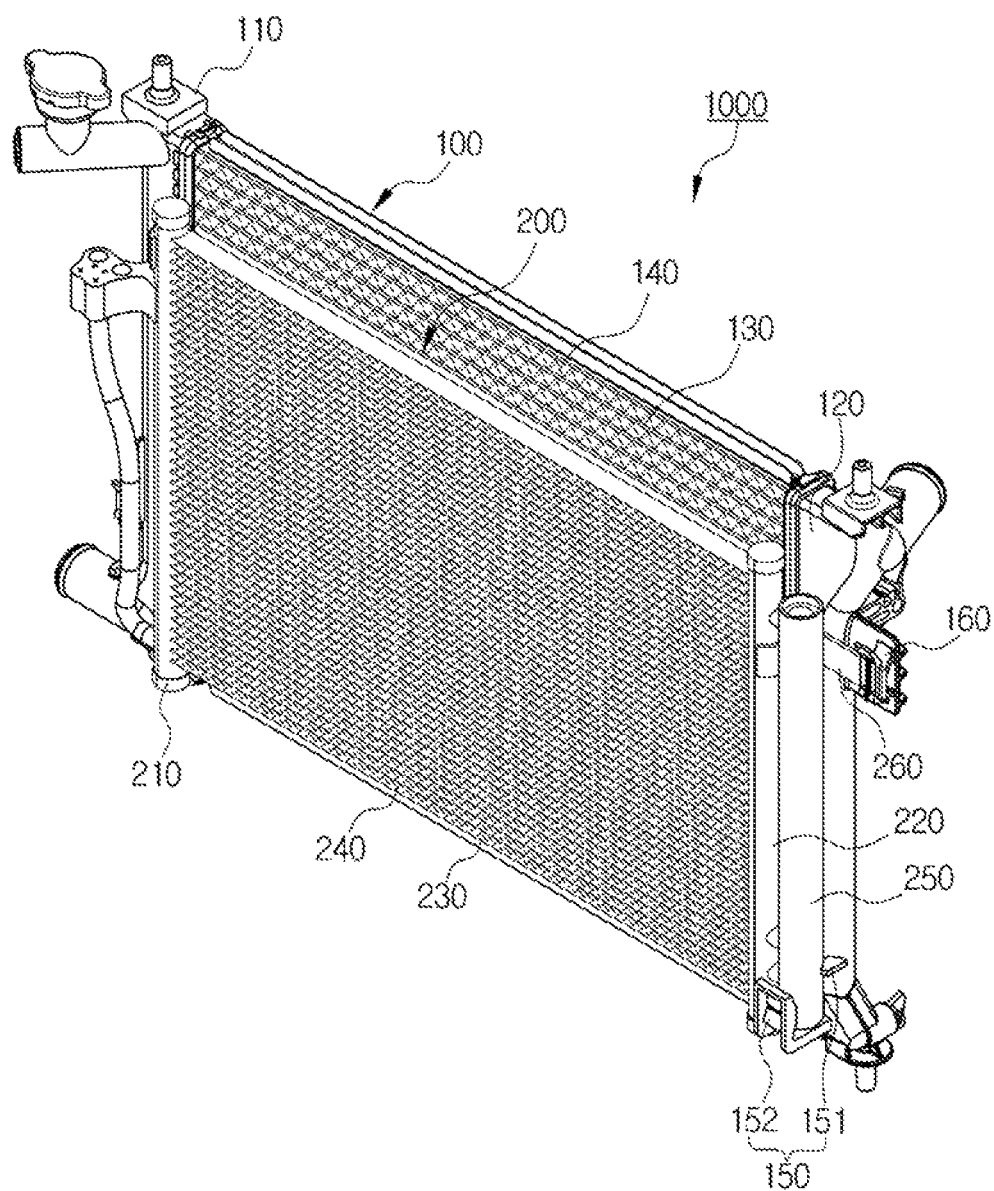
FIG. 3 is an assembled perspective view illustrating a radiator and condenser assembly according to an exemplary embodiment of the present invention.
Figure 4:
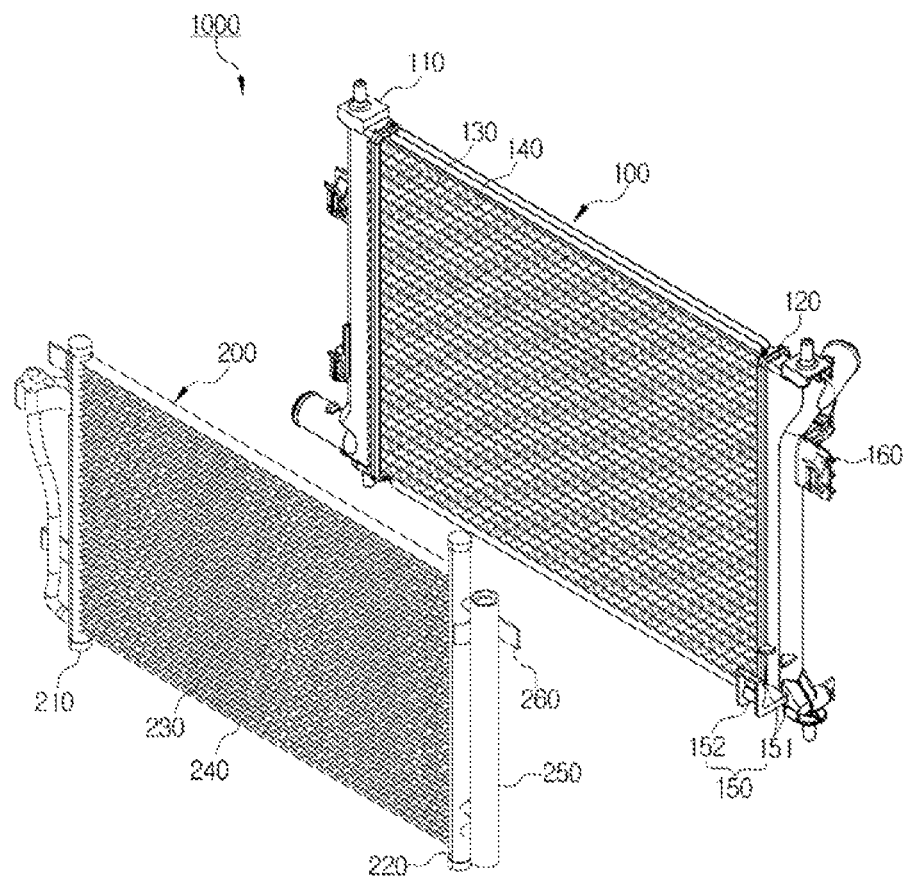
FIG. 4 is an exploded perspective view illustrating a radiator and condenser assembling structure according to an exemplary embodiment of the present invention.
Figure 5:
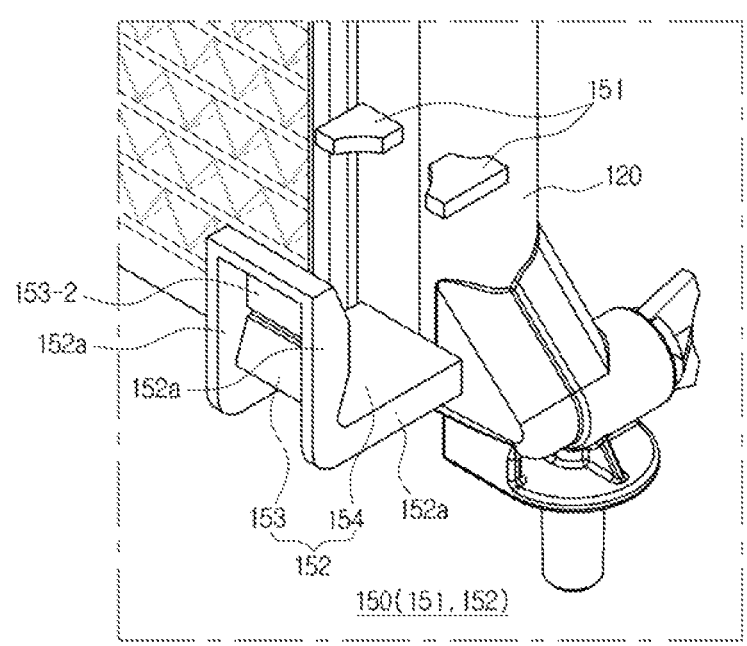
FIG. 5 is a partial perspective view illustrating a fixed part of a radiator according to an exemplary embodiment of the present invention.

FIG. 3 is an assembled perspective view illustrating a radiator and condenser assembly according to an exemplary embodiment of the present invention, FIG. 4 is an exploded perspective view illustrating a radiator and condenser assembling structure according to an exemplary embodiment of the present invention, and FIG. 5 is a partial perspective view illustrating a fixed part of a radiator according to an exemplary embodiment of the present invention.

As illustrated, a radiator and condenser assembly 1000 according to an exemplary embodiment of the present invention includes: a radiator 100 including a 1-1-th header tank 110 and a 1-2-th header tank 120, a plurality of first tubes 130 having both ends fixed to the 1-1-th header tank 110 and the 1-2-th header tank 120, first fins 140 inserted between the first tubes 130, and a fixed part 150 formed at a lower portion of the 1-2-th header tank 120; and a condenser 200 including a 2-1-th header tank 210 and a 2-2-th header tank 220, a plurality of second tubes 230 having both ends fixed to the 2-1-th header tank 210 and the 2-2-th header tank 220 to form a refrigerant passage, second fins 240 inserted between the second tubes 230, and a vapor-liquid separator 250 connected to the 2-2-th header tank 220 to separate a vapor refrigerant and a liquid refrigerant, wherein the lower portion of the vapor-liquid separator 250 of the condenser 200 is coupled and fixed to the fixed part 150 of the radiator 100 and the vapor-liquid separator 250 is inserted into the fixed part 150 downward from above and thus the fixed part 150 fixes the movement of the vapor-liquid separator 250 in a front and back direction and a left and right direction.

First, the radiator and condenser assembly 1000 according to the exemplary embodiment of the present invention is formed by assembling the radiator 100 with the condenser 200 in large.

In the radiator 100, the 1-1-th header tank 110 and the 1-2-th header tank 120 are formed in parallel while being spaced apart from each other by a predetermined distance, both ends of the plurality of first tubes 130 are installed between the 1-1-th header tank 110 and the 1-2-th header tank 120 and coupled and fixed thereto to form a coolant passage, and the first fins 140 may be inserted between the first tubes 130. Further, the fixed part 150 is formed at a lower portion of the 1-2-th header tank 120.

In the condenser 200, the 2-1-th header tank 210 and the 2-2-th header tank 220 may be formed in parallel while being spaced apart from each other by a predetermined distance, both ends of the plurality of second tubes 230 installed between the 2-1-th header tank 210 and the 2-2-th header tank 220 may be coupled and fixed to each other to form a coolant passage, and the second fins 240 may be inserted between the second tubes 230. Further, the vapor-liquid separator 250 may be connected to the 2-2-th header tank 220 to separate a gas refrigerant and a liquid refrigerant and the vapor-liquid separator 250 may be formed in a cylindrical shape and may be formed in parallel to the 2-2-th header tank 220 while being separated from the 2-2-th header tank 220.

In this case, the lower portion of the vapor-liquid separator 250 of the condenser 200 may be coupled and fixed to the fixed part 150 of the radiator 100 and the vapor-liquid separator 250 may be inserted into the fixed part 150 downward from above, such that the fixed part 150 may fix the movement of the vapor-liquid separator 250 in a front and back direction and a left and right direction.

That is, the vapor-liquid separator 250 may be disposed at the upper portion of the fixed part 150 and then move downward to insert the lower portion of the vapor-liquid separator 250 into the fixed part 150, thereby fixing the movement of the vapor-liquid separator 250 in the front and back direction and the left and right direction. Therefore, all of the movement of the vapor-liquid separator 250 in a radial direction may be fixed.

In this case, the upper and lower portions of the 1-1-th header tank 110 of the radiator 100 and the upper portion of the 1-2-th header tank 120 may be formed with a separate upper coupling part and in the condenser 200, the position corresponding to the upper coupling part may be formed with the upper bracket to insert the upper bracket into the upper coupling part downward from above, thereby fixing the movement of the vapor-liquid separator 250 in an up and down direction. That is, the existing structure in which the radiator is coupled with the condenser may be applied.

Therefore, in the radiator and condenser assembly according to the exemplary embodiment of the present invention, the lower portion of the vapor-liquid separator of the condenser may be inserted into the fixed part of the radiator to remove the bracket (one) formed in the condenser, thereby saving component manufacturing costs and additional process and processing costs for forming the bracket.

Further, in the state in which the vapor-liquid separator of the condenser is inserted into the fixed part of the radiator, the movement of the vapor-liquid separator in the front and back direction and the left and right direction is fixed, and therefore the whole of the condenser including the vapor-liquid separator may be accurately fixed without clearance in the state in which it is assembled with the radiator. Therefore, the condenser assembled in the radiator may be firmly fixed without shaking due to vibration, etc., to prevent the condenser and the coupling part from being damaged and the refrigerant in the condenser from being leaked.

Further, at least three places of an outer circumferential surface of the vapor-liquid separator 250 of the condenser 200 based on a central axis may be supported by the fixed part 150 of the radiator 100.

That is, when the vapor-liquid separator 250 is formed in the cylindrical shape, three places of the outer circumferential surface may be supported at an interval of about 120° or at least three places thereof may be supported, such that the movement of the vapor-liquid separator in the front and back direction and the left and right direction may be fixed.

Figure 9:
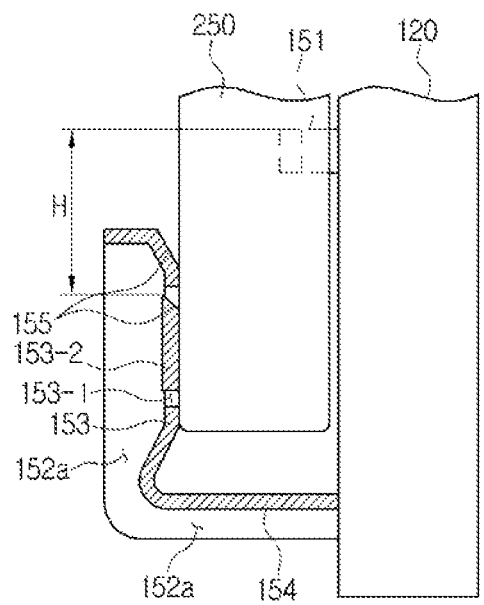

In this case, as illustrated in FIG. 9, a space part may also be formed between a lower side surface of the vapor-liquid separator 250 and a horizontal part 154 of the fixed bracket 152 while being spaced by a predetermined distance in a height direction.

Figure 10:
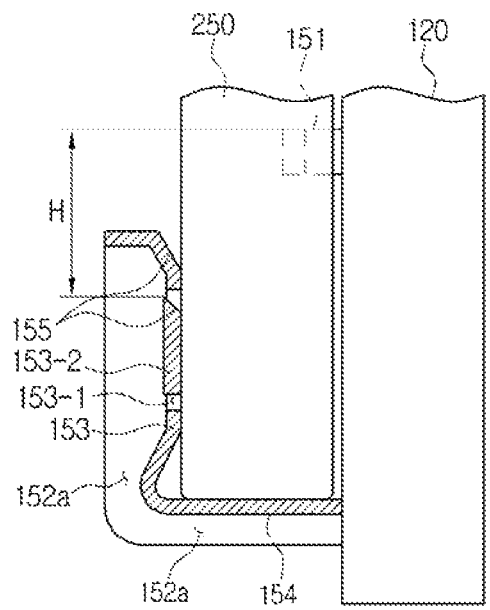

According to another exemplary embodiment of the present invention, as illustrated in FIG. 10, a lower end of the vapor-liquid separator 250 may also be supported by the fixed part 150.

That is, the vapor-liquid separator 250 is inserted into the fixed part 150 downward from above, and therefore a lower end of the fixed part 150 is formed to be stopped or a projecting part, etc., to lock the lower end of the vapor-liquid separator 250 is formed, such that the lower end of the vapor-liquid separator 250 may be supported by the fixed part 150.

Further, the fixed part 150 of the radiator 100 may include a pair of fixed protrusions 151 protruding from the 1-2-th header tank 120 and spaced apart from each other to support one side of the outer circumferential surface of the vapor-liquid separator 250 and the fixed bracket 152 including the horizontal part 154 and the vertical part 153 extending in an 'L' shape from the 1-2-th header tank 120, in which the vertical part 153 supports the other side of the outer circumferential surface of the vapor-liquid separator 250.

That is, as illustrated in FIG. 5, the fixed part 150 of the radiator 100 is formed to support three places of the outer circumferential surfaces of the vapor-liquid separator 250. In more detail, the pair of fixed protrusions 151 protrudes from the 1-2-th header tank 120 and is spaced apart from each other and the fixed bracket 152 includes the horizontal part 154 and the vertical part 153 extending in an 'L' shape from the 1-2-th header tank 120. Therefore, one side of the outer circumferential surface of the vapor-liquid separator 250 may be supported by the pair of fixed protrusions 151 and the other side thereof may be supported by the vertical part 153 of the fixed bracket 152. In this case, the pair of fixed protrusions 151 are disposed at both sides of a central line connecting among the vertical part 153 of the fixed bracket 152, the vapor-liquid separator 250, and the 1-2-th header tank 120, such that the vapor-liquid separator 250 may be fixed to the fixed part 150, thereby fixing the movement of the vapor-liquid separator 250 in the front and back direction and the left and right direction. Further, the lower end of the vapor-liquid separator 250 may be supported by the horizontal part 154 of the fixed bracket 152.

Further, the vertical part 153 of the fixed bracket 152 may include a cut part 153-1 in a 'C' shape and a support part 153-2 formed by the cut part 153-1 may protrude from the vertical part 153 toward the 1-2-th header tank 120.

Figure 6:
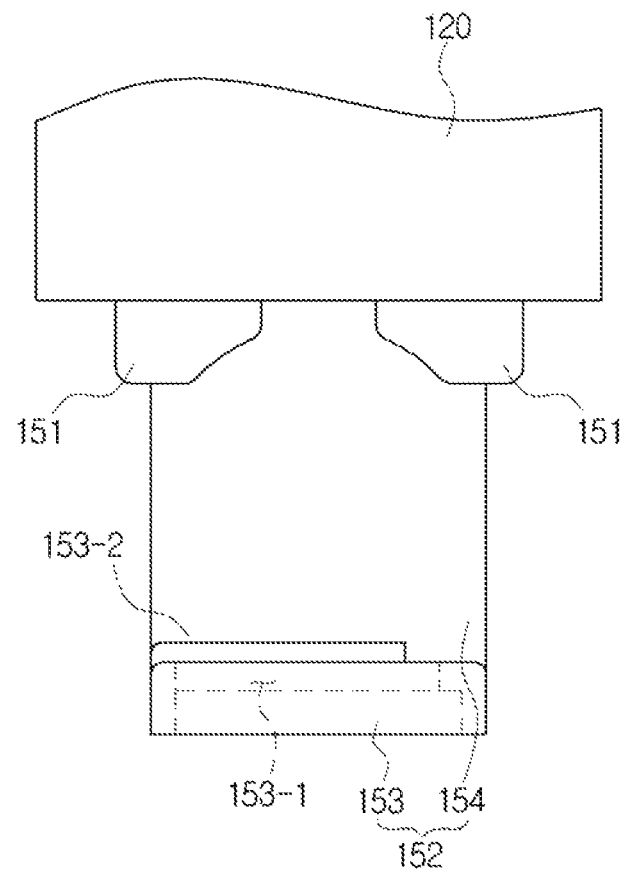
FIGS. 6 to 10 are an upper plan view and a side cross-sectional view illustrating a fixed part and vapor-liquid separator assembling structure according to the exemplary embodiment of the present invention.
Figure 7:
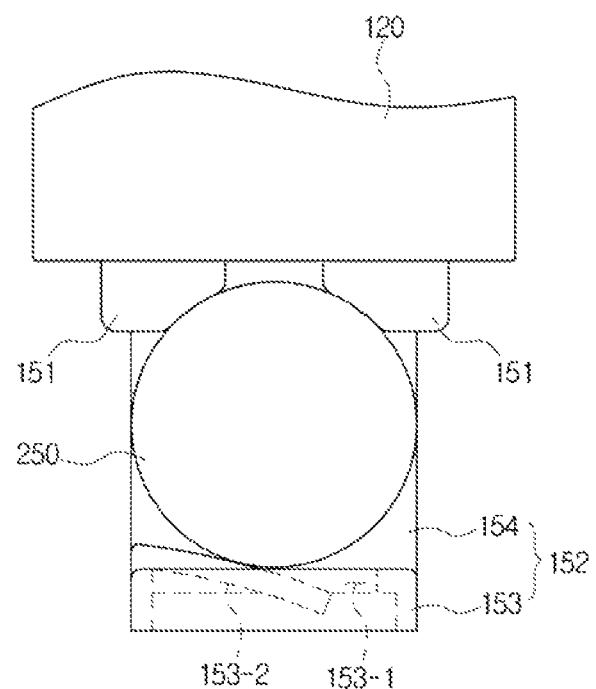
Figure 8:
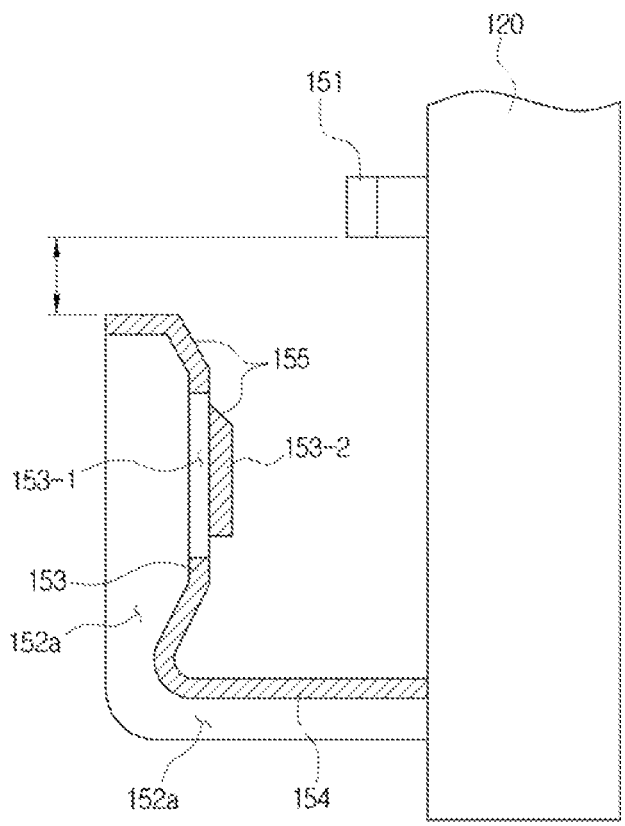
Figure 11:
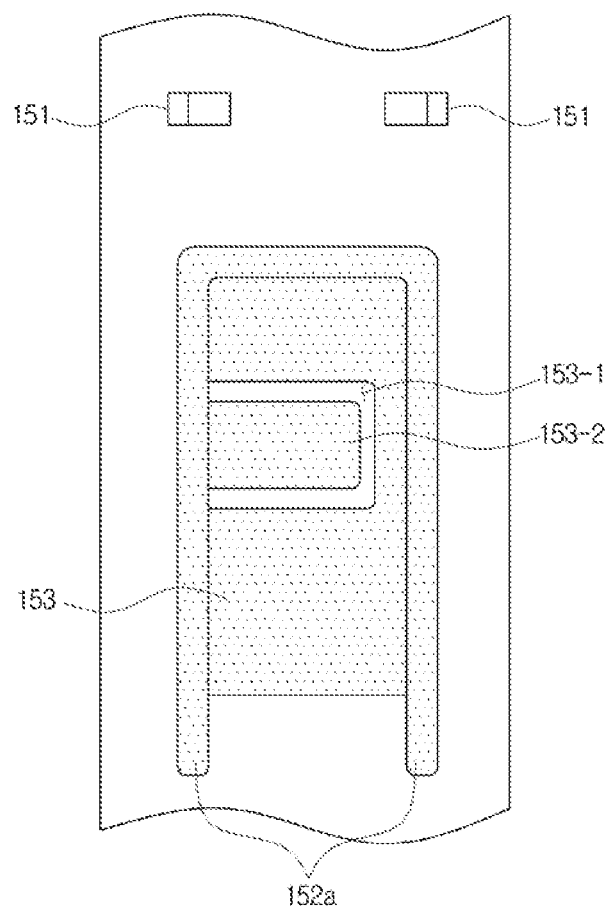
FIG. 11 is a front view illustrating the fixed part according to the exemplary embodiment of the present invention.
Figure 12:
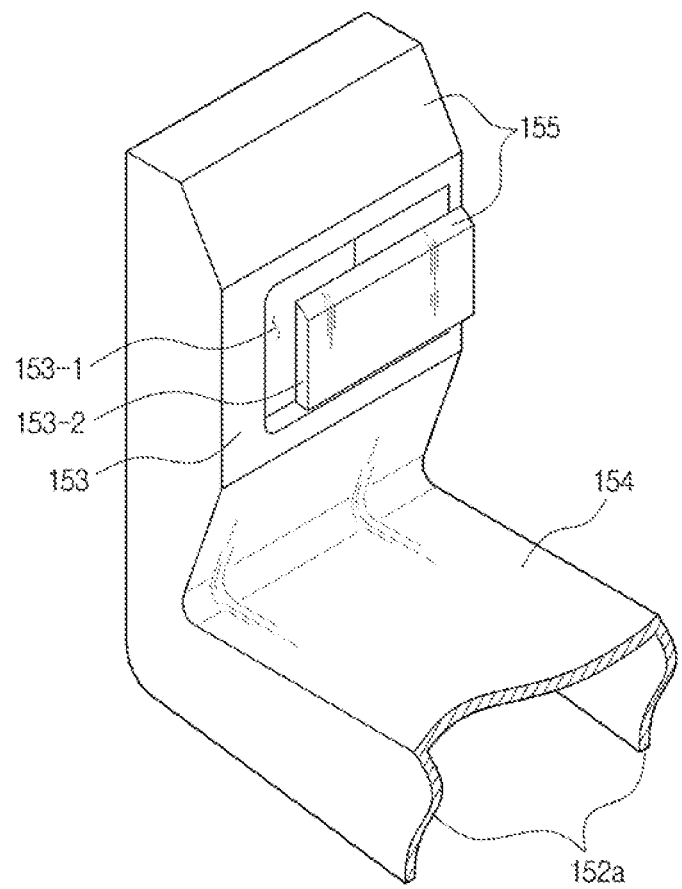
FIG. 12 is another perspective view illustrating the fixed part according to the exemplary embodiment of the present invention.

That is, as illustrated in FIGS. 6 to 12, the vertical part 153 of the fixed bracket 152 may include the support part 153-2 so that the vapor-liquid separator 250 may be adhered and fixed to the pair of fixed protrusions 151 and the support part 153-2 may have elasticity and protrude from the vertical part 153 toward the 1-2-th header tank 120 so that the vapor-liquid separator 250 may adhere to the fixed protrusion 151 when the vapor-liquid separator 250 is inserted into the fixed part 150 by the support part 153-2. Further, the cut part 153-1 may be formed in the 'C' shape around the support part 153-2 of the vertical part 153, and thus the support part 153-2 may be pushed by the vapor-liquid separator 250. In more detail, as illustrated in FIG. 11, the vertical part 153 includes the cut part 153-1 in the form in which the 'C' shape rotates at 180°, in which the cut part 153-1 becomes an empty space. As the cut part 153-1 is formed, the remaining left of the support part 153-2 may be the fixed end in the state in which it is coupled with the vertical part 153 or a reinforcement rib 152a and the right of the support part 153-2 may be a free end. Further, as illustrated in FIGS. 6, 8, and 12, the support part 153-2 protrudes from the inner side surface (surface facing the 1-2-th header tank 120) of the vertical part 153 and thus as illustrated in FIGS. 7 and 9, when the vapor-liquid separator 250 is inserted, the support part 153-2 may be pushed into an opposite side to the protruding portion and the vapor-liquid separator 250 may adhere to the 1-2-th header tank 120 by the elasticity of the support part 153-2.

In this case, the cut part 153-1 may not be formed in the 'C' shape but formed as a through part of which the whole inside is empty and one side of the support part 153-2 may be fixed to the vertical part 153 or the reinforcement rib 152a and the other side thereof may be the free end, such that the support part 153-2 may be pushed into the cut part 153-1 formed as the through part upon the insertion of the vapor-liquid separator 250.

Further, the upper end of the inside of the vertical part 153 and the support part 153-2 may be formed with an inclined part 155.

That is, when the vapor-liquid separator 250 is inserted into the fixed part 150 downward from above, the upper end of the inside of the vertical part 153 and the support part 153-2 may be formed with the inclined part 155 so that the vapor-liquid separator 250 may be easily inserted without being locked to the upper end of the vertical part 153 and the upper end of the support part 153-2 of the fixed part 150.

Further, the 'L'-shaped inside or outside of the fixed bracket 152 may be formed with the reinforcement rib 152a.

That is, the fixed bracket 152 may have to firmly support the outer circumferential surface and the lower end of the vapor-liquid separator 250 when the vapor-liquid separator 250 is inserted into the fixed bracket 152, and therefore as illustrated, the 'L'-shaped outsides of the vertical part 153 and the horizontal part 154 may be formed with the reinforcement rib 152a. Alternatively, if the vertical part 153 and the horizontal part 154 do not interfere with the vapor-liquid separator 250 and other components, the insides of the vertical part 153 and the horizontal part 154 may also be formed with the reinforcement rib 152a.

Further, in the fixed part 150, a height of the pair of fixed protrusions 151 may be higher than that of the upper end of the vertical part 153 and a distance H to the upper side surface of the fixed protrusion 151 and the upper end of the support part 153-2 may be 30 mm or so.

That is, when the 1-2-th tank 120 of the radiator 100 is made of a resin material, the fixed part 150 may be integrated with the 1-2-th tank 120 by an injection molding. In this case, positions of the fixed protrusion 151 and the fixed bracket 152 may be designed to prevent the interference of a mold and cores in characteristics of the injection molding. Therefore, the injection mold may be easily manufactured and the fixed part 150 may be integrated with the 1-2-th tank 120 by the injection molding.

The present invention is not limited to the above-mentioned exemplary embodiments but may be variously applied, and may be variously modified by those skilled in the art to which the present invention pertains without departing from the gist of the present invention claimed in the claims.

DETAILED DESCRIPTION OF MAIN ELEMENTS

1000: Radiator and condenser assembly
100: Radiator
110: 1-1-th header tank
120: 1-2-th header tank
130: First tube
140: First fin
150: Fixed part
151: Fixed protrusion
152: Fixed bracket
152a: Reinforcement rib
153: Vertical part
153-1: Cut part
153-2: Support part
154: Horizontal part
155: Inclined part
160: Upper coupling part
200: Condenser
210: 2-1-th header tank
220: 2-2-th header tank
230: Second tube
240: Second fin
250: Vapor-liquid separator
260: Upper bracket

The invention claimed is:

1. A radiator and condenser assembly, comprising:
a radiator including a first header tank and a second header tank, a plurality of first tubes having a first end fixed to the first header tank and a second end fixed to the second header tank, first fins inserted between the first tubes, and a fixed part formed at a lower portion of the second header tank; and
a condenser including a third header tank and a fourth header tank, a plurality of second tubes having a first end fixed to the third header tank and a second end fixed to the fourth header tank to form a refrigerant passage, second fins inserted between the second tubes, and a vapor-liquid separator connected to the fourth header tank to separate a vapor refrigerant and a liquid refrigerant, wherein air flows through the radiator and the condenser in series while flowing in a first direction, wherein the fixed part of the radiator includes a pair of fixed protrusions protruding from the second header tank and a fixed bracket extending from the second header tank,
wherein the pair of fixed protrusions protrude from the second header tank in the first direction and are spaced apart from each other in a second direction arranged perpendicular to the first direction,
wherein the fixed bracket includes a horizontal part extending from the second header tank in the first direction and a vertical part extending from an end portion of the horizontal part in a third direction arranged perpendicular to the first direction and the second direction, the vertical part spaced apart from the pair of fixed protrusions and the second header tank with respect to the first direction,
wherein a lower portion of the vapor-liquid separator of the condenser is inserted into the fixed part of the radiator in the third direction to be coupled to the radiator,
wherein at least three positions on an outer circumferential surface of the vapor-liquid separator are in contact with the pair of fixed protrusions and the vertical part, respectively, thereby enabling the pair of fixed protrusions and the vertical part to fix movement of the vapor-liquid separator in the first direction and the second direction, and
wherein a lowermost surface of the vapor-liquid separator with respect to the third direction is supported on and contacts the horizontal part of the fixed bracket,
wherein the horizontal part of the fixed bracket is formed beneath the pair of fixed protrusions in the third direction, and the vertical part of the fixed bracket extends upwardly from the horizontal part in the third direction towards the pair of fixed protrusions,
wherein an upper portion of the second header tank is provided with an upper coupling part and, at a position corresponding to the upper coupling part, the condenser is provided with an upper bracket to allow the upper bracket to be inserted into the upper coupling part downwardly from the upper portion in the third direction, and
wherein a portion of the horizontal part that is in contact with the vapor-liquid separator is disposed between the end portion of the horizontal part and the second header tank.

2. The radiator and condenser assembly of claim 1, wherein the vertical part of the fixed bracket includes a cut part in a 'C' shape and a support part that protrudes towards the second header tank.

3. The radiator and condenser assembly of claim 2, wherein an upper end of an inside of the vertical part and the support part is provided with an inclined part.

4. The radiator and condenser assembly of claim 3, wherein in the fixed part, a distance H from an upper side surface of one of the fixed protrusions of the pair of fixed protrusions to an upper end of the support part is within 30 mm.

5. The radiator and condenser assembly of claim 1, wherein in the fixed bracket, an 'L'-shaped inside or an outside is provided with a reinforcement rib.

6. The radiator and condenser assembly of claim 1, wherein in the fixed part, a height of the pair of fixed protrusions is higher than that of an upper end of the vertical part.

7. The radiator and condenser assembly of claim 6, wherein the fixed part is integrated with the second header tank by an injection molding.

8. The radiator and condenser assembly of claim 1, wherein the first header tank, the second header tank, and the first tubes, the first fins, and the fixed part of the radiator are disposed on a first plane while the third header tank, the fourth header tank, the second tubes, the second fins, and the vapor-liquid separator of the condenser are located on a second plane, the first plane arranged parallel to the second plane and spaced from the second plane in the first direction.

9. The radiator and condenser assembly of claim 1, wherein the first header tank, the second header tank, the third header tank, and the fourth header tank extend longitudinally in the third direction, and wherein the first tubes and the second tubes extend longitudinally in the second direction.

10. The radiator and condenser assembly of claim 1, wherein the lowermost surface of the vapor-liquid separator rests on an uppermost surface of the horizontal part of the fixed bracket to prevent downward movement of the vapor-liquid separator in the third direction.

11. The radiator and condenser assembly of claim 1, wherein each of the pair of fixed protrusions of the pair of fixed protrusions includes an arcuate surface corresponding in shape to a portion of the outer circumferential surface of the vapor-liquid separator.

12. The radiator and condenser assembly of claim 11, wherein each of the arcuate surfaces curve around an axis extending in the third direction.

13. The radiator and condenser assembly of claim 2, wherein the support part includes a base portion and a free end spaced from the base portion.

14. The radiator and condenser assembly of claim 13, wherein the support part is inclined in the first direction towards the second header tank.

15. The radiator and condenser assembly of claim 13, wherein the support part is configured to elastically pivot about the base portion, the pivoting of the support part causing the free end to move in the first direction.

16. The radiator and condenser assembly of claim 1, wherein the upper coupling part includes a U-shaped portion configured to receive the upper bracket.

* * * * *